US012627862B2

(12) United States Patent　　(10) Patent No.: US 12,627,862 B2
Zhu et al.　　(45) Date of Patent: May 12, 2026

(54) SMART TELEVISION CONTROL METHOD AND DEVICE

(71) Applicant: Honor Device Co., Ltd., Shenzhen (CN)

(72) Inventors: Hua Zhu, Shenzhen (CN); Wenjiang Quan, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/717,343

(22) PCT Filed: Apr. 12, 2023

(86) PCT No.: PCT/CN2023/087760
　　§ 371 (c)(1),
　　(2) Date: Jun. 6, 2024

(87) PCT Pub. No.: WO2023/241189
　　PCT Pub. Date: Dec. 21, 2023

(65) Prior Publication Data

US 2025/0047949 A1　　Feb. 6, 2025

(30) Foreign Application Priority Data

Jun. 14, 2022　(CN) .......................... 202210671886.7

(51) Int. Cl.
　　*G06F 3/0481*　　(2022.01)
　　*G06F 3/04812*　　(2022.01)
　　*H04N 21/482*　　(2011.01)
(52) U.S. Cl.
　　CPC ....... *H04N 21/482* (2013.01); *G06F 3/04812* (2013.01)

(58) Field of Classification Search
None
See application file for complete search history.

(56) References Cited

U.S. PATENT DOCUMENTS 6,160,536 A * 12/2000 Forest ................... G06F 3/0236
　　　　　　　　　　　　345/157
2008/0320413 A1* 12/2008 Oshiro .................. G06F 3/0484
　　　　　　　　　　　　715/792
(Continued)

FOREIGN PATENT DOCUMENTS

CN　　　　103475940 A　　12/2013
CN　　　　104007927 A　*　8/2014
(Continued)

*Primary Examiner* — Rong Le
(74) *Attorney, Agent, or Firm* — Conley Rose, P.C.

(57) ABSTRACT

A smart television control method and a device. The smart television control method includes displaying a first interface, where the first interface includes a target application button, and the target application button is associated with preview data; after a cursor is detected to be positioned on the target application button, timing a dwell duration of the cursor on the target application button; and after the dwell duration is determined to exceed a duration threshold, starting a target application corresponding to the target application button. According to the foregoing technical solution, after the cursor is positioned to the application button, user intention may be recognized, and the target application may be automatically started, to avoid a user failing to successfully start the application due to impact of preview content, thereby improving user experience.

20 Claims, 14 Drawing Sheets

(56) References Cited

U.S. PATENT DOCUMENTS

| | | |
|---|---|---|
| 2013/0326558 A1 | 12/2013 | Kuo et al. |
| 2019/0187873 A1 | 6/2019 | Kim et al. |
| 2020/0145726 A1 | 5/2020 | Ciuca et al. |
| 2020/0167173 A1 | 5/2020 | Wang et al. |
| 2020/0304863 A1 | 9/2020 | Domm et al. |

FOREIGN PATENT DOCUMENTS

| | | |
|---|---|---|
| CN | 105824403 A | 8/2016 |
| CN | 105824409 A | 8/2016 |
| CN | 107179859 A | 9/2017 |
| CN | 109521926 A | 3/2019 |
| CN | 109561334 A | 4/2019 |
| CN | 109922364 A | 6/2019 |
| CN | 111880694 A | 11/2020 |
| CN | 111901682 A | 11/2020 |
| CN | 112015486 A | 12/2020 |

* cited by examiner

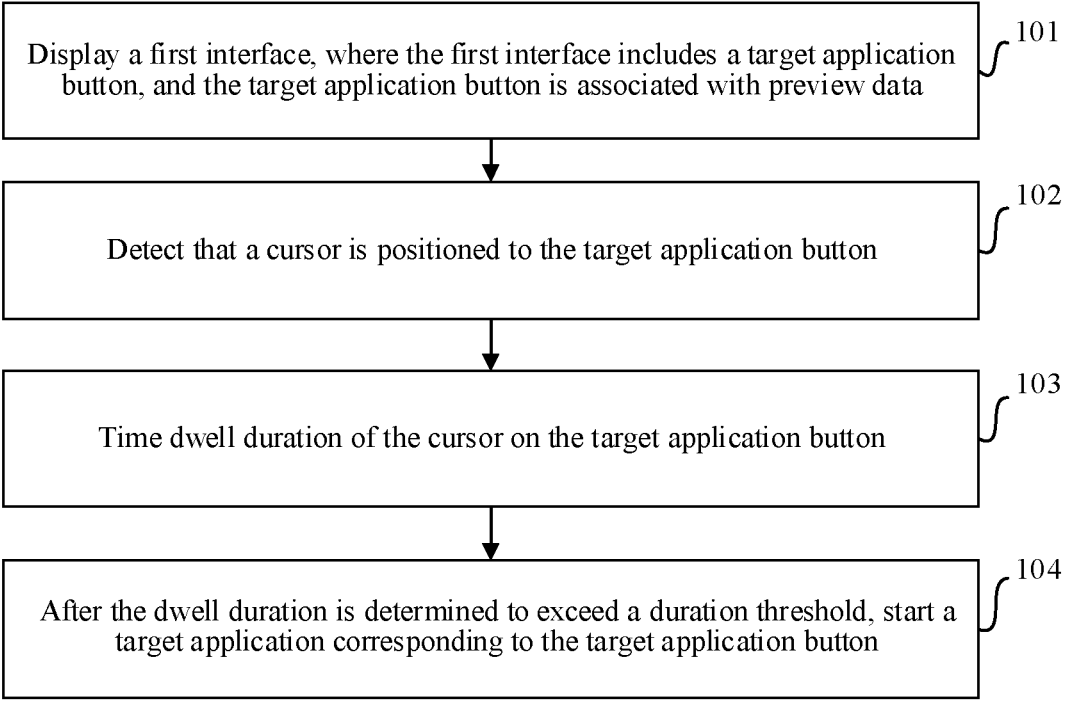

Display a first interface, where the first interface includes a target application button, and the target application button is associated with preview data ⟍ 101

Detect that a cursor is positioned to the target application button ⟍ 102

Time dwell duration of the cursor on the target application button ⟍ 103

After the dwell duration is determined to exceed a duration threshold, start a target application corresponding to the target application button ⟍ 104

FIG. 3

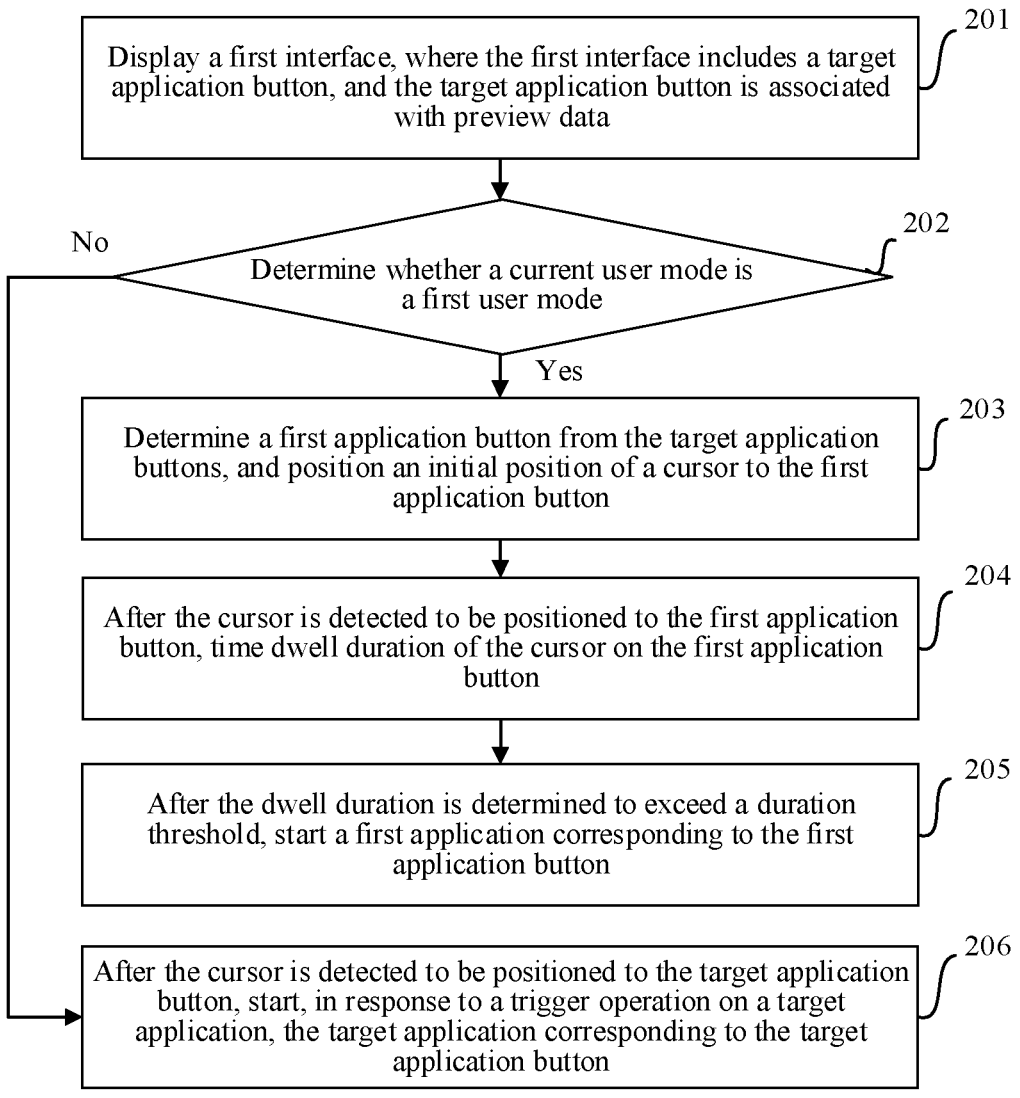

Display a first interface, where the first interface includes a target application button, and the target application button is associated with preview data — 201

Determine whether a current user mode is a first user mode — 202

No

Yes

Determine a first application button from the target application buttons, and position an initial position of a cursor to the first application button — 203

After the cursor is detected to be positioned to the first application button, time dwell duration of the cursor on the first application button — 204

After the dwell duration is determined to exceed a duration threshold, start a first application corresponding to the first application button — 205

After the cursor is detected to be positioned to the target application button, start, in response to a trigger operation on a target application, the target application corresponding to the target application button — 206

FIG. 8

SMART TELEVISION CONTROL METHOD AND DEVICE

CROSS-REFERENCE TO RELATED APPLICATIONS

This is a U.S. National Stage of International Application No. PCT/CN2023/087760 filed on Apr. 12, 2023, which claims priority to Chinese Patent Application No. 202210671886.7, filed with the China National Intellectual Property Administration on Jun. 14, 2022, both of which are incorporated herein by reference in their entireties.

TECHNICAL FIELD

This application relates to the field of terminal technologies, and in particular, to a smart television control method and a device.

BACKGROUND

Different from a conventional television, a smart television can not only support installation and use of various applications, but also provide content from different input sources such as a high definition multimedia interface (High Definition Multimedia Interface, HDMI), while providing a user with common television content. In this way, although variety requirements of the user are satisfied, difficulty for an elderly user to use the smart television is increased.

In a common scenario, when the user enters a home page of the smart television and positions a cursor on a specific application icon, display of preview content about the application is usually triggered, such as video clips of popular dramas and application interfaces. This can easily make the user mistakenly think that the application has been opened, and therefore the user performs no further operations, which causes poor user experience.

SUMMARY

This application provides a smart television control method and a device, to implement autonomous recognition of user intention, and automatically start an application when it is determined that a user has the intention to start the application, thereby improving user experience.

According to a first aspect, this technical solution provides a smart television control method, including: displaying a first interface, where the first interface includes a target application button, and the target application button is associated with preview data; detecting that a cursor is positioned to the target application button; timing dwell duration of the cursor on the target application button; and after the dwell duration is determined to exceed a duration threshold, starting a target application corresponding to the target application button.

In the smart television control method provided in the foregoing technical solution, after the cursor is detected to be positioned to the target application button, the dwell duration of the cursor on the target application button is timed. After the dwell duration is determined to exceed the duration threshold, the target application corresponding to the target application button may be started. According to the foregoing technical solution, the user intention may be recognized, and the target application may be automatically started, to avoid a user failing to successfully start the application due to impact of preview content, thereby improving user experience.

With reference to the first aspect, in some implementations of the first aspect, before the detecting that a cursor is positioned to the target application button, the method further includes: determining that a current user mode is a first user mode.

In this implementation, a user mode may be set and the user intention may be recognized automatically in the first user mode. According to this implementation, the smart television control method can be more flexible and diverse, better satisfying requirements of different user groups.

With reference to the first aspect, in some implementations of the first aspect, after the determining that a current user mode is a first user mode, the method further includes: determining a first application button from the target application buttons; and positioning an initial position of the cursor to the first application button.

In this implementation, in the first user mode, the initial position of the cursor in the first interface may be automatically positioned to the first application button. According to this implementation, an operation process performed by the user can be facilitated.

With reference to the first aspect, in some implementations of the first aspect, when it is determined that the current user mode is not the first user mode, and after the detecting that a cursor is positioned to the target application button, the method further includes: in response to a trigger operation on the target application button, starting the target application corresponding to the target application button.

With reference to the first aspect, in some implementations of the first aspect, when it is determined that the current user mode is not the first user mode, the method further includes: switching the current user mode to the first user mode in response to a target operation.

With reference to the first aspect, in some implementations of the first aspect, the first interface further includes a first operation button; and the switching the current user mode to the first user mode in response to a target operation includes: displaying a first setting interface in response to a first operation on the first operation button, where the first setting interface includes a first mode selection button; and switching the current user mode to the first user mode in response to a second operation on the first mode selection button.

With reference to the first aspect, in some implementations of the first aspect, after the detecting that a cursor is positioned to the target application button, the method further includes: displaying a first control on the first interface. The first control includes first text, and the first text indicates remaining duration before the target application is started.

In this implementation, after the cursor is detected to be positioned to the target application button, text information indicating the remaining duration before the target application is started is displayed on the first interface. In this way, the user obtains information about the remaining duration before the target application is started more intuitively and accurately.

With reference to the first aspect, in some implementations of the first aspect, the first interface includes a background page; and after the detecting that a cursor is positioned to the target application button, the method further includes: displaying the preview data associated with the target application button on the background page.

With reference to the first aspect, in some implementations of the first aspect, the preview data includes video preview data; and after the starting a target application corresponding to the target application button, the method further includes: determining first multimedia data corresponding to the video preview data, where the first multimedia data includes first video data and first audio data; and playing the first multimedia data in a playback window associated with the target application.

With reference to the first aspect, in some implementations of the first aspect, the first interface further includes a foreground page; and the displaying a first interface includes: displaying the foreground page, where the foreground page includes a dockbar, and the dockbar includes the target application button.

According to a second aspect, this technical solution provides an electronic device, including: a display unit, configured to display a first interface, where the first interface includes a target application button, and the target application button is associated with preview data; a detection unit, configured to detect that a cursor is positioned to the target application button; a timing unit, configured to time dwell duration of the cursor on the target application button; and an execution unit, configured to start, after the dwell duration is determined to exceed a duration threshold, a target application corresponding to the target application button.

In the smart television control method provided in the foregoing technical solution, after the cursor is detected to be positioned to the target application button, the dwell duration of the cursor on the target application button is timed. After the dwell duration is determined to exceed the duration threshold, the target application corresponding to the target application button may be started. According to the foregoing technical solution, the user intention may be recognized, and the target application may be automatically started, to avoid a user failing to successfully start the application due to impact of preview content, thereby improving user experience.

With reference to the second aspect, in some implementations of the second aspect, the electronic device further includes a mode selection unit, configured to determine that a current user mode is a first user mode before the detection unit detects that the cursor is positioned to the target application button.

In this implementation, a user mode may be set and the user intention may be recognized automatically in the first user mode. According to this implementation, the smart television control method can be more flexible and diverse, better satisfying requirements of different user groups.

With reference to the second aspect, in some implementations of the second aspect, after the mode selection unit determines that the current user mode is the first user mode, the detection unit is further configured to: determine a first application button from the target application buttons, and position an initial position of the cursor to the first application button.

In this implementation, in the first user mode, the initial position of the cursor in the first interface may be automatically positioned to the first application button. According to this implementation, an operation process performed by the user can be facilitated.

With reference to the second aspect, in some implementations of the second aspect, when the mode selection unit determines that the current user mode is not the first user mode, and after the detection unit detects that the cursor is positioned to the target application button, the execution unit is further configured to start, in response to a trigger operation on the target application button, the target application corresponding to the target application button.

With reference to the second aspect, in some implementations of the second aspect, when it is determined that the current user mode is not the first user mode, the mode selection unit is further configured to switch the current user mode to the first user mode in response to a target operation.

With reference to the second aspect, in some implementations of the second aspect, the first interface further includes a first operation button. The mode selection unit is specifically configured to: display a first setting interface in response to a first operation on the first operation button, where the first setting interface includes a first mode selection button; and switch the current user mode to the first user mode in response to a second operation on the first mode selection button.

With reference to the second aspect, in some implementations of the second aspect, after the cursor is detected to be positioned to the target application button, the detection unit is further configured to display a first control on the first interface. The first control includes first text, and the first text indicates remaining duration before the target application is started.

In this implementation, after the cursor is detected to be positioned to the target application button, text information indicating the remaining duration before the target application is started is displayed on the first interface. In this way, the user obtains information about the remaining duration before the target application is started more intuitively and accurately.

With reference to the second aspect, in some implementations of the second aspect, the first interface includes a background page. After the cursor is detected to be positioned to the target application button, the detection unit is further configured to display the preview data associated with the target application button on the background page.

With reference to the second aspect, in some implementations of the second aspect, the preview data includes video preview data. After the target application corresponding to the target application button is started, the execution unit is further configured to: determine first multimedia data corresponding to the video preview data, where the first multimedia data includes first video data and first audio data; and play the first multimedia data in a playback window associated with the target application.

With reference to the second aspect, in some implementations of the second aspect, the first interface further includes a foreground page. The display unit is specifically configured to display the foreground page. The foreground page includes a dockbar, and the dockbar includes the target application button.

According to a third aspect, this technical solution provides an electronic device, including one or more processors, a memory, and one or more computer programs. The one or more computer programs are stored in the memory. The one or more computer programs include instructions. When the instructions are executed by the device, the device is enabled to perform the method according to any one of the first aspect or the possible implementations of the first aspect.

According to a fourth aspect, this technical solution provides an electronic device. The device includes a storage medium and a central processing unit. The storage medium may be a non-volatile storage medium, and a computer-executable program is stored in the storage medium. The central processing unit is connected to the non-volatile storage medium, and executes the computer-executable program to implement the method according to any one of the first aspect or the possible implementations of the first aspect.

According to a fifth aspect, this technical solution provides a chip. The chip includes a processor and a data interface. The processor reads, by using the data interface, instructions stored in a memory, to perform the method according to any one of the first aspect or the possible implementations of the first aspect.

Optionally, in an implementation, the chip may further include a memory. The memory stores instructions. The processor is configured to execute the instructions stored in the memory. When the instructions are executed, the processor is configured to perform the method according to any one of the first aspect or the possible implementations of the first aspect.

According to a sixth aspect, this technical solution provides a computer-readable storage medium. The computer-readable medium stores program code to be executed by device. The program code includes instructions for executing the method according to any one of the first aspect or the possible implementations of the first aspect.

In the foregoing technical solution, first, a first interface may be displayed. The first interface includes a target application button, and the target application button is associated with preview data. After a cursor is detected to be positioned to the target application button, dwell duration of the cursor on the target application button may be timed. After the dwell duration is determined to exceed a duration threshold, a target application corresponding to the target application button may be started. According to the foregoing technical solution, after the cursor is positioned to the application button, user intention may be recognized, and the target application may be automatically started, to avoid a user failing to successfully start the application due to impact of preview content, thereby improving user experience.

BRIEF DESCRIPTION OF DRAWINGS

FIG. 3 is a schematic flowchart of a smart television control method according to an embodiment of this application;

FIG. 8 is another schematic flowchart of a smart television control method according to an embodiment of this application;

DESCRIPTION OF EMBODIMENTS

Before embodiments of this application are described, the related technology is introduced first.

A smart television is an emerging television product in context of the Internet. Compared with a conventional television, in addition to providing a user with normal television content, the smart television can not only support installation and use of various applications, such as common video applications and music applications, but also provide content from different input sources, such as a high definition multimedia interface (High Definition Multimedia Interface, HDMI).

FIG. TA is a schematic diagram of a scenario of a smart television control method according to an embodiment of this application. As shown in FIG. TA, a smart television 001 may display a first interface 100. The first interface 100 may be an interface displayed after the smart television is turned on. The first interface 100 may include a foreground page 110 and a background page 120. A display level of the background page 120 is located below the foreground page 110.

Figure 1A:
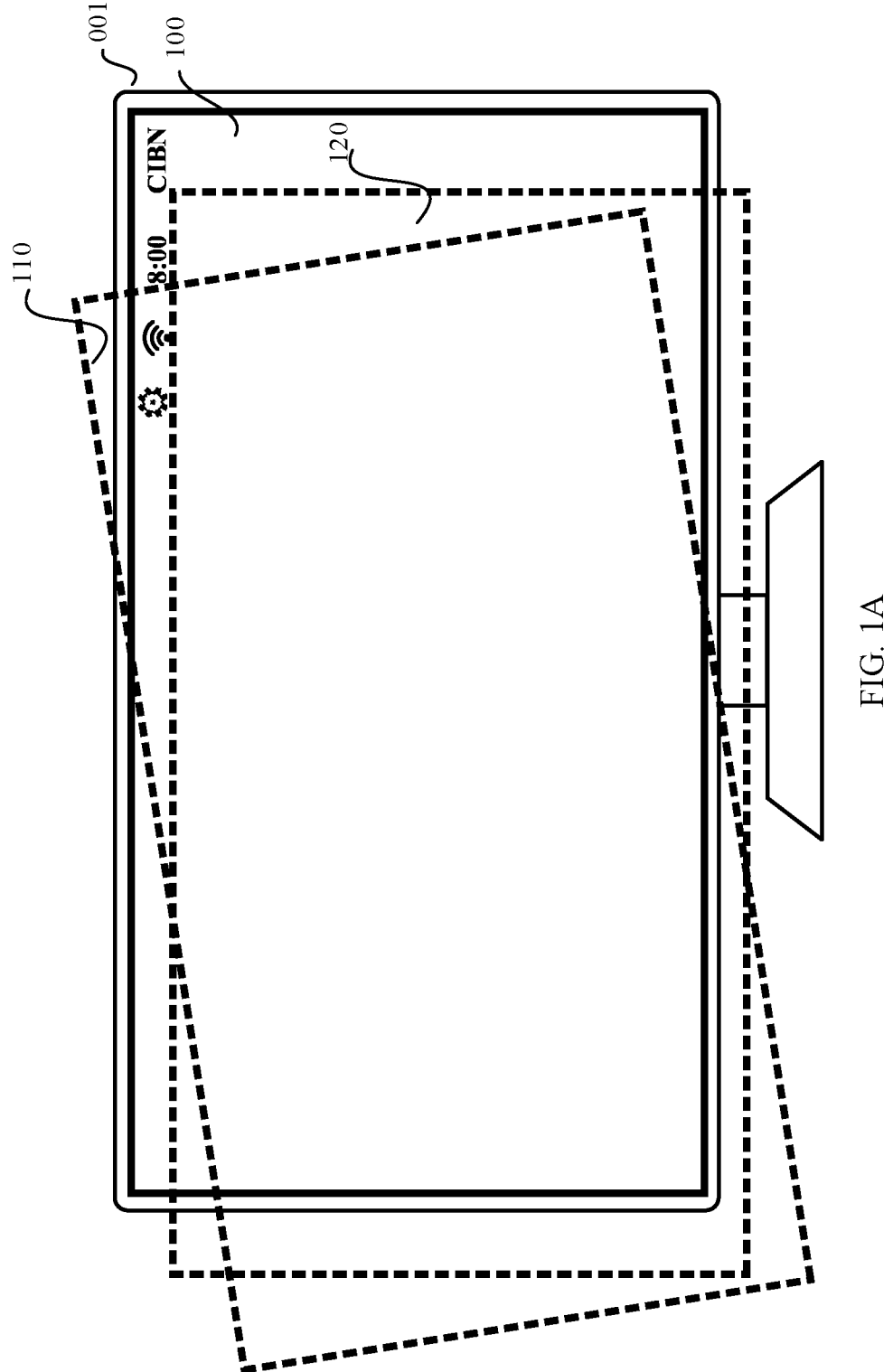
FIG. 1A is a schematic diagram of a scenario of a smart television control method according to an embodiment of this application.
Figure 1B:
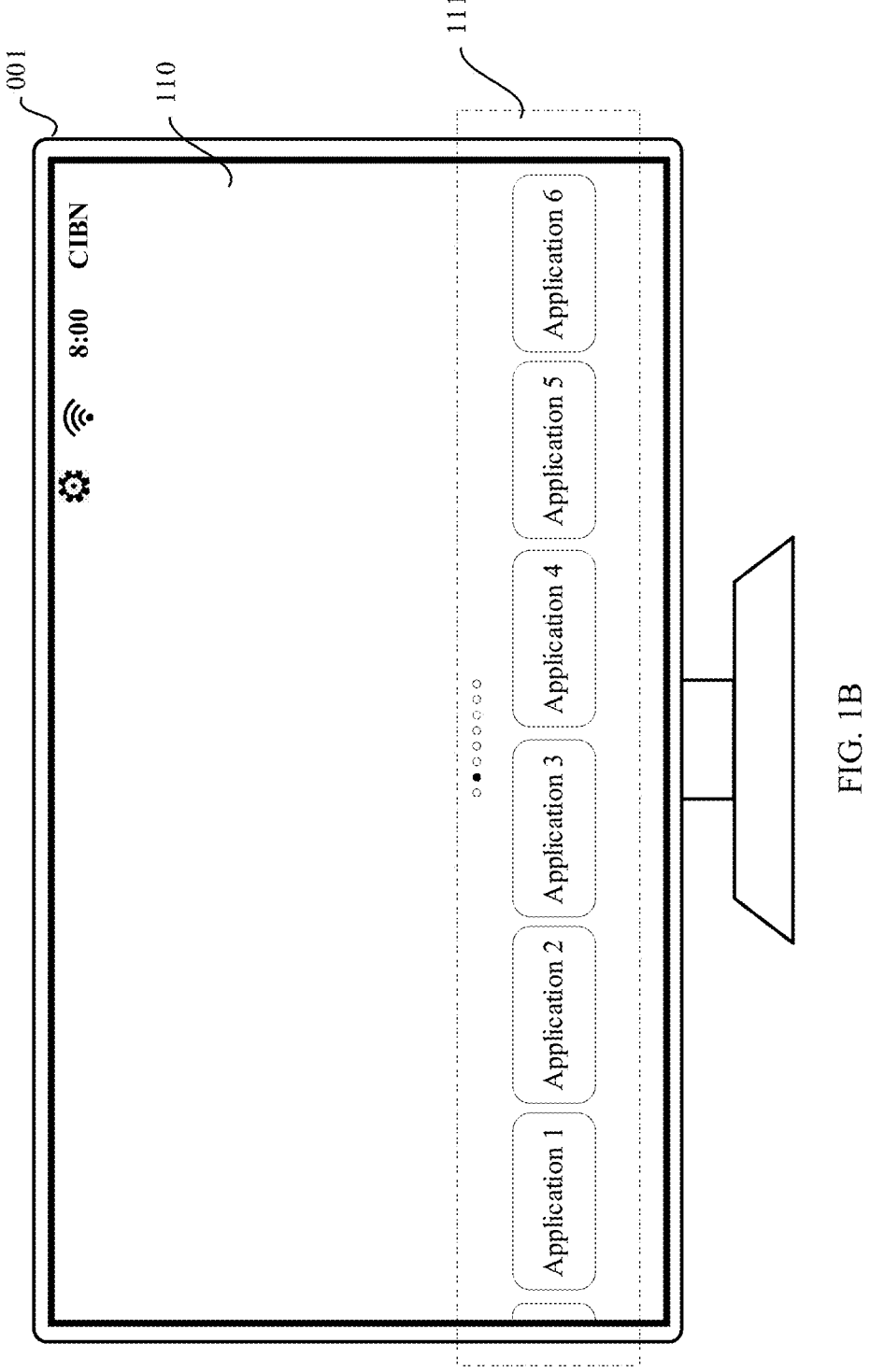
FIG. 1B is a schematic diagram of another scenario of a smart television control method according to an embodiment of this application.

Further, FIG. 1B is a schematic diagram of another scenario of a smart television control method according to an embodiment of this application. As shown in FIG. 1B, a foreground page 110 may include a dockbar 111. For example, the dockbar 111 may be arranged in a lower part of the foreground page 110. The dockbar 111 may include a plurality of application buttons, and the application corresponding to each application button may be started via the application button. For example, the plurality of application buttons may include an input source application button, a new audio-visual application button, a video application button, a music application button, a MeeTime application button, and the like. An input source application corresponding to the input source application button may be used for providing multimedia content from different input sources. For example, when an accessed input source is HDMI 1, the input source application may be used for providing multimedia content from the input source HDMI 1. When the input source is set to HDMI 2, the input source application may be used for providing multimedia content from the input source HDMI 2.

Figure 2:
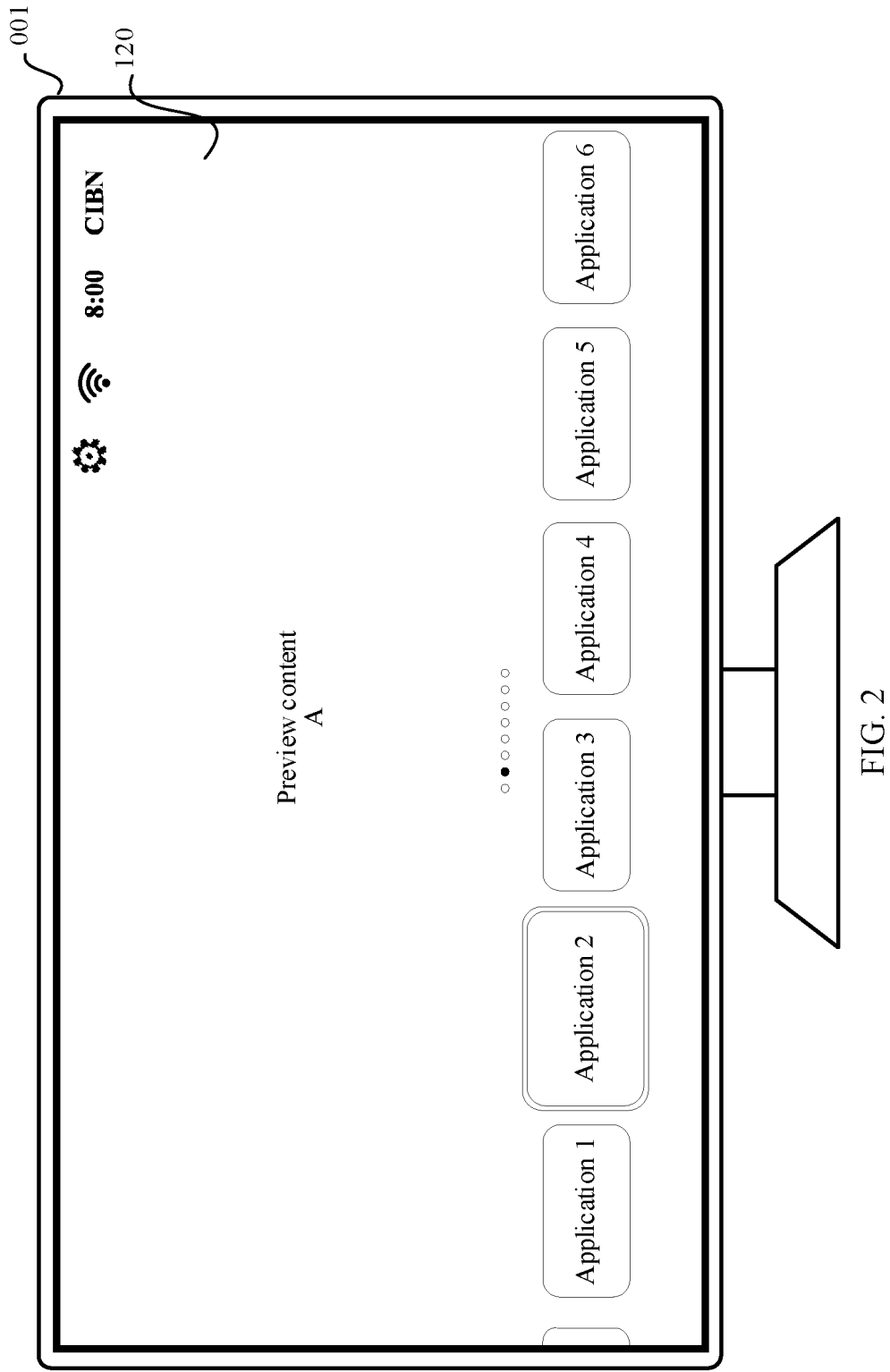
FIG. 2 is a schematic diagram of another scenario of a smart television control method according to an embodiment of this application.

In an existing implementation scenario, when a user enters the first interface 100, a cursor may be positioned on an application button, and the application button is selected. It should be understood that "a cursor may be positioned on an application button" described in this application means that a focus is on the application button. This operation may cause a style of the application button to change to enable the selected application button to be highlighted. For example, that a style of the application button changes may be referred to as increasing a graphic size, strengthening an edge, enhancing lighting effect outside the edge, and the like. As shown in FIG. 2, an example in which a cursor is positioned on a button of an application 2 is used. In this case, a graphic size of the button of the application 2 is increased and lighting effect outside an edge is enhanced. In this way, the button of the application 2 may be highlighted compared to remaining application buttons.

After the cursor is positioned on the application button, preview content of the application is triggered to be displayed on a background page 120. Commonly, when the cursor is positioned on an input source application button, a preview video from an input source may be displayed on the background page 120. When the cursor is positioned on a new audio-visual application button, a poster, an application interface, or the like about a new audio-visual application may be displayed on the background page 120. In this case, a user, especially an elderly user who is not familiar with use of the smart television, is likely to mistakenly think that the application has already been opened, and therefore does not perform any further operation. As a result, the application fails to be started. This causes a poor user experience.

To resolve the foregoing problem, this application is proposed.

In this application, after a cursor is detected to be positioned on an application button, dwell duration of the cursor on the application button is timed. After the dwell duration of the cursor on the application button is determined to exceed a duration threshold, an application corresponding to the application button may be started. According to technical solutions of this application, automatic recognition of user intention may be implemented, and the application may be automatically started based on the user intention, thereby improving user experience.

The following describes technical solutions of this application with reference to the accompanying drawings.

FIG. 3 is a schematic flowchart of a smart television control method according to an embodiment of this application. As shown in FIG. 3, the smart television control method according to this embodiment of this application includes:

101. Display a first interface, where the first interface includes a target application button, and the target application button is associated with preview data.

102. Detect that a cursor is positioned to the target application button.

103. Time dwell duration of the cursor on the target application button.

104. After the dwell duration is determined to exceed a duration threshold, start a target application corresponding to the target application button.

In this embodiment of this application, application buttons in the first interface may be categorized into different types. For example, two types, an application button associated with preview data and an application button not associated with preview data, may be included. In an actual scenario, only the application button associated with the preview data may display the preview data when being positioned by the cursor. In other words, the application button associated with the preview data are more likely to cause a user to mistakenly determine an application startup process. Therefore, in a possible implementation, the application button associated with the preview data may be used as a target application button.

Further, for the application button associated with the preview data, the associated preview data may also be categorized into different types. For example, the preview data may include video preview data, application interface picture preview data, poster picture preview data, and the like. It is considered that the video preview data and the application interface picture preview data are more likely to affect determining of the user on the application startup process when preview is started. Therefore, in another possible implementation, an application button associated with the video preview data or the application interface picture preview data may be used as the target application button. For example, the target application button may include an input source application button (which is associated with the video preview data), a new audio-visual application button (which is associated with the application interface picture preview data), and the like.

In this embodiment of this application, after the first interface is displayed, a position of the cursor may be detected in real time.

Figure 4A:
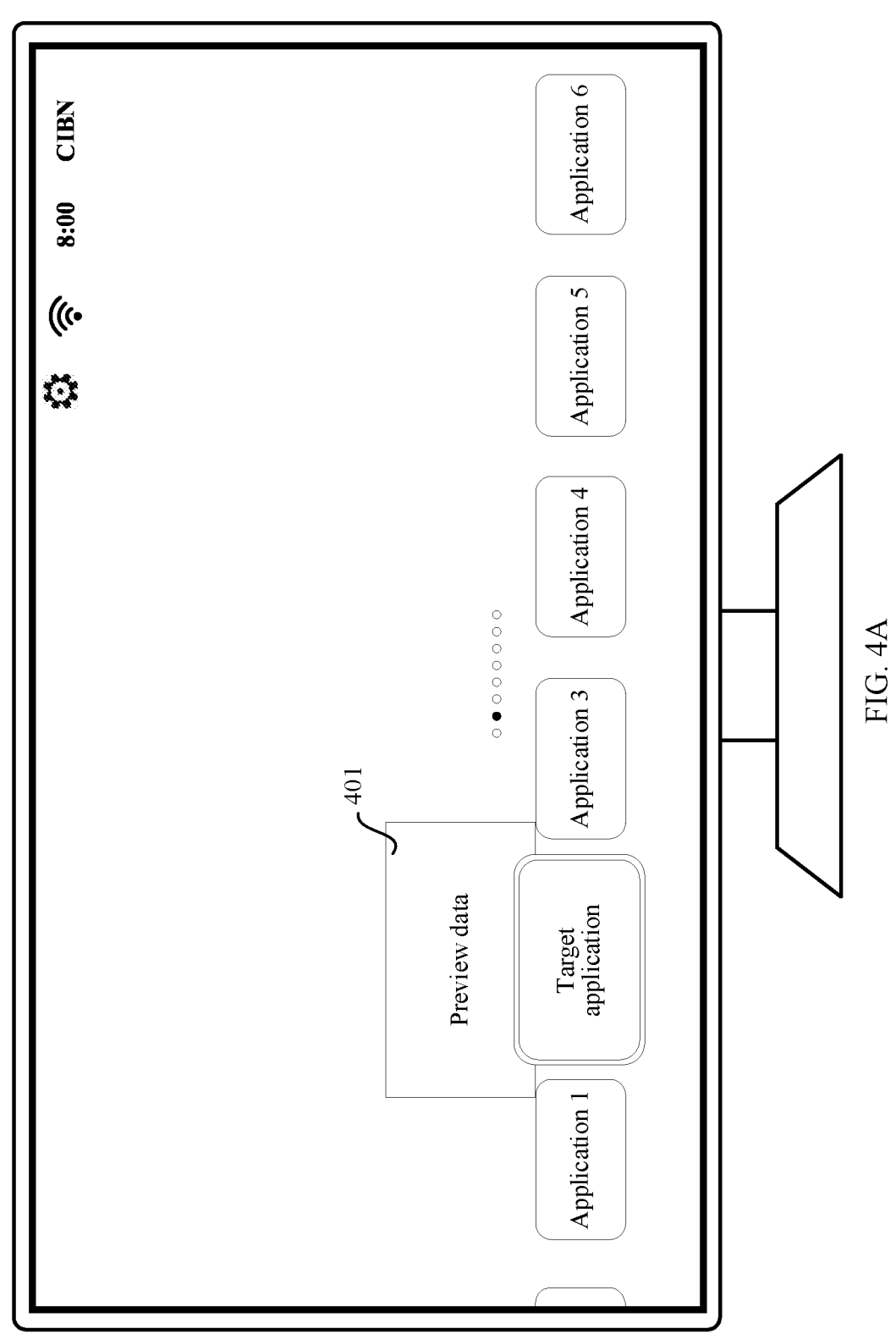
FIG. 4A is a schematic diagram of another scenario of a smart television control method according to an embodiment of this application.
Figure 4B:
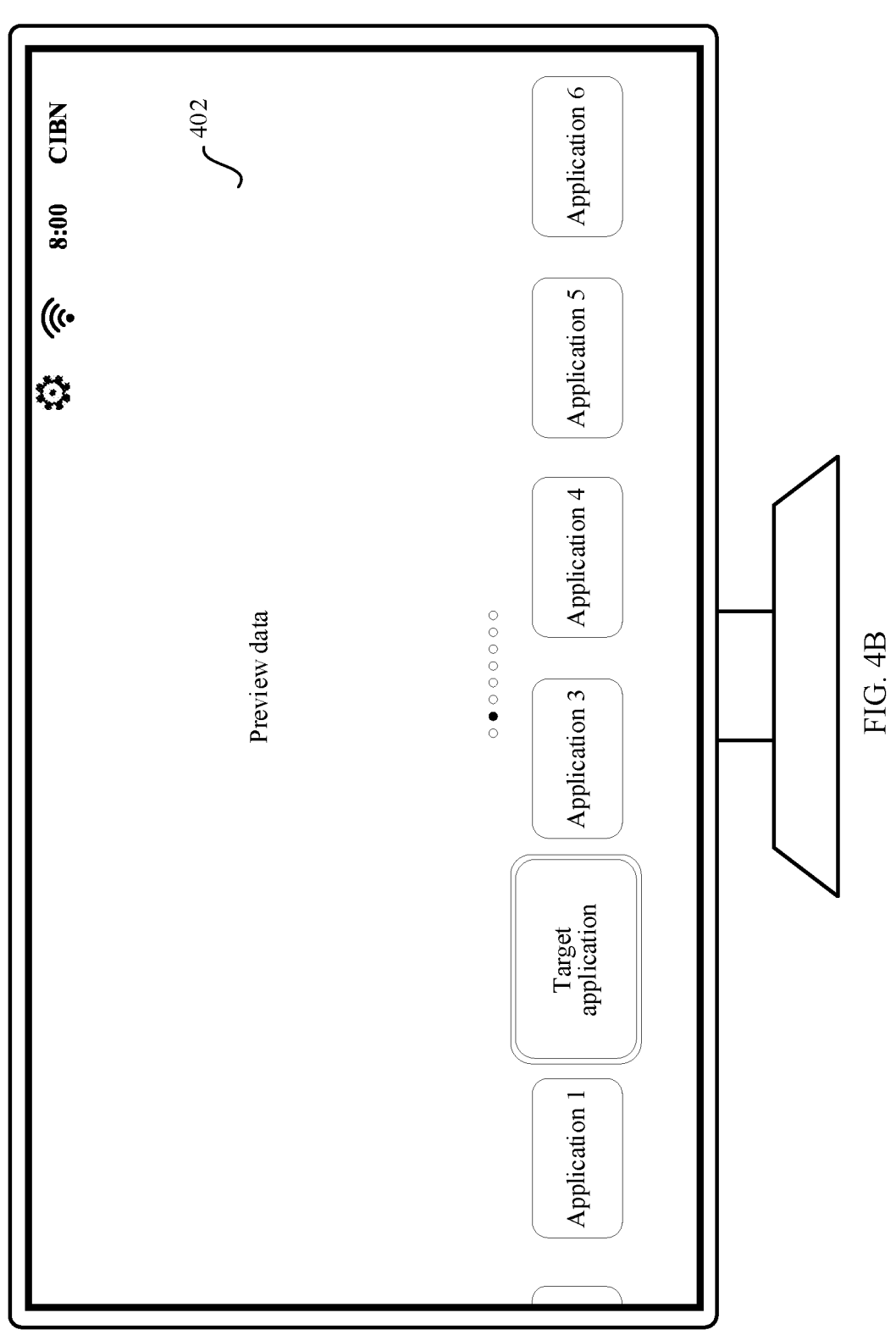
FIG. 4B is a schematic diagram of another scenario of a smart television control method according to an embodiment of this application.

After the cursor is detected to be positioned to the target application button, the background page 120 of the first interface 100 may display preview data associated with the target application button. Specifically, the background page 120 may include a preview window. The preview data associated with the target application button may be displayed in the preview window. As shown in FIG. 4A, the preview window may be a small screen preview window 401 located behind the target application button. Alternatively, as shown in FIG. 4B, the preview window may be a big screen preview window 402 tiled on the background page.

Before the preview data is displayed, it is necessary to obtain the preview data first. The following describes how to obtain different types of preview data.

Specifically, for the video preview data, corresponding video preview data may be generated based on a first multimedia data provided by a target application. The first multimedia data may include first video data and first audio data. In a possible implementation, the first video data in the first multimedia data may be determined as the video preview data, and displayed in the preview window. In another possible implementation, the first video data in the first multimedia data may be edited, to obtain the video preview data for displaying in the preview window. It may be understood that, because the video preview data does not include the first audio data, a user may only perceive picture information not sound information, during previewing and displaying the video preview data.

For the application interface picture preview data, a screenshot of an application interface of the target application may be taken in advance to obtain an application interface picture for storing as the application interface picture preview data.

It should be noted that display content of the foreground page 110 may remain unchanged while the preview data is displayed on the background page 120. Specifically, controls such as the dockbar 111 and application buttons located in the dockbar 111 may remain displayed on the foreground page 110. In addition, to prevent the display content of the foreground page 110 from blocking the preview data of the background page 120, a graphic style of each control in the foreground page 110 may be changed. For example, transparency of each control in the foreground page 110, such as each application button, may be improved, changing from an opaque state to a semitransparent state.

Further, to recognize user intention for starting an application, in this embodiment of this application, after a cursor is detected to be positioned to the target application button, dwell duration of the cursor on the target application button may also be timed. Specifically, after the cursor is detected to be positioned to the target application button, a timer may be triggered to be started to time the dwell duration of the cursor.

To show the user the foregoing timing process more intuitively, in this embodiment of this application, after the cursor is detected to be positioned to the target application button, a first control 501 may also be displayed on a first interface 100. The first control 501 may include first text. The first text indicates remaining duration before the target application is started.

Figure 5:
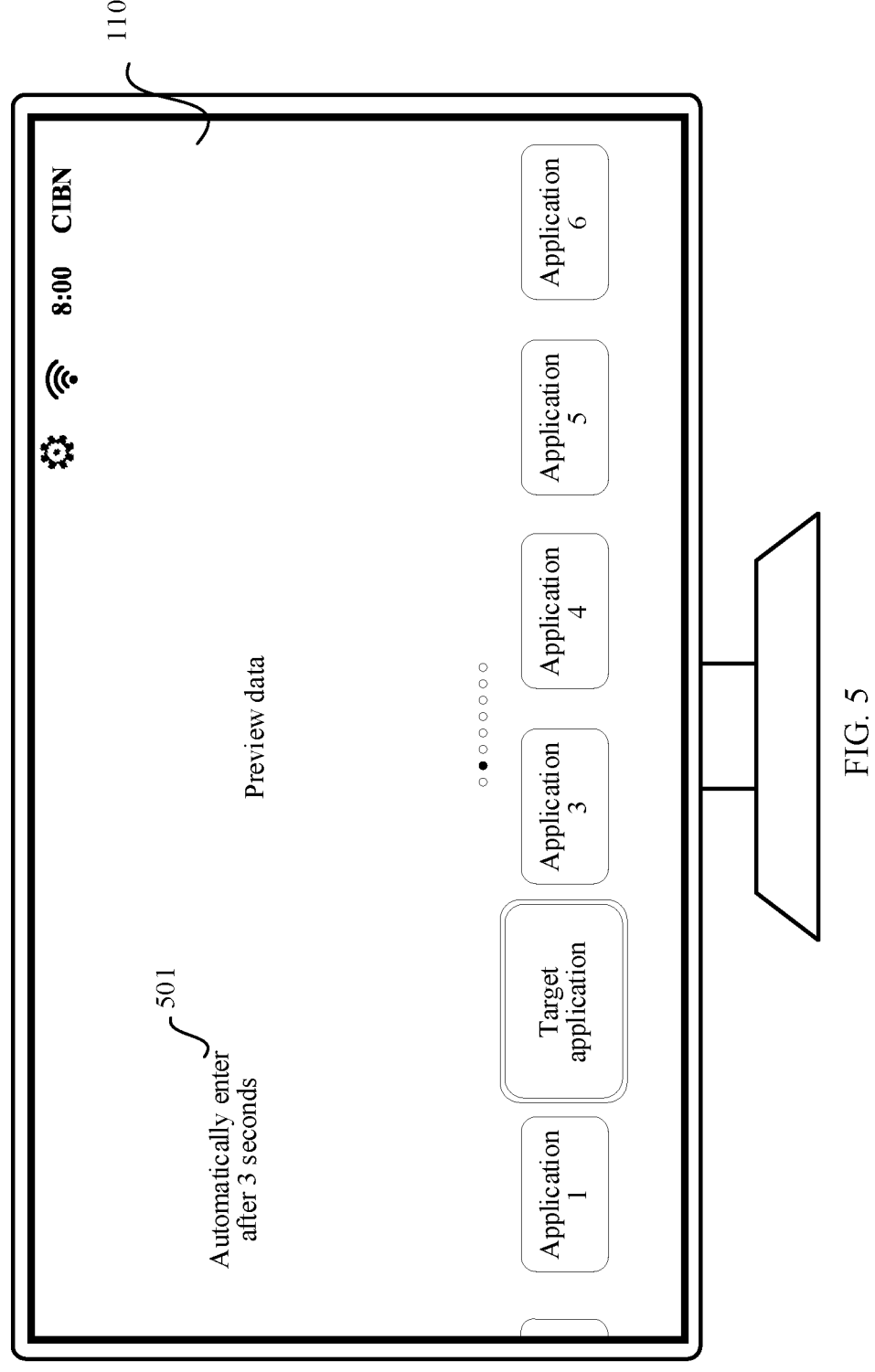
FIG. 5 is a schematic diagram of another scenario of a smart television control method according to an embodiment of this application.

FIG. 5 is a diagram of an implementation scenario of the first control. As shown in FIG. 5, the first control 501 may be displayed on a foreground page 110 of the first interface 100, and may be specifically located in an upper left part of the foreground page 110. Content of the first text may be, for example, "automatically enter after X seconds" and "automatically start after X seconds". A specific value of the X seconds may be determined based on dwell duration of a current cursor on a target application button and a pre-set duration threshold.

The foregoing duration threshold may be used for representing a critical value of duration for triggering a target application to be started. In other words, after the dwell duration of the cursor is determined, based on a timing result, to reach the duration threshold, it may be considered that the user has intention to start the target application. In this case, the target application may be automatically started.

According to the foregoing method, automatic recognition of user intention may be implemented and a target application currently positioned by the user may be automatically started without performing a related trigger operation by the user. Therefore, user experience is improved.

Figure 6:
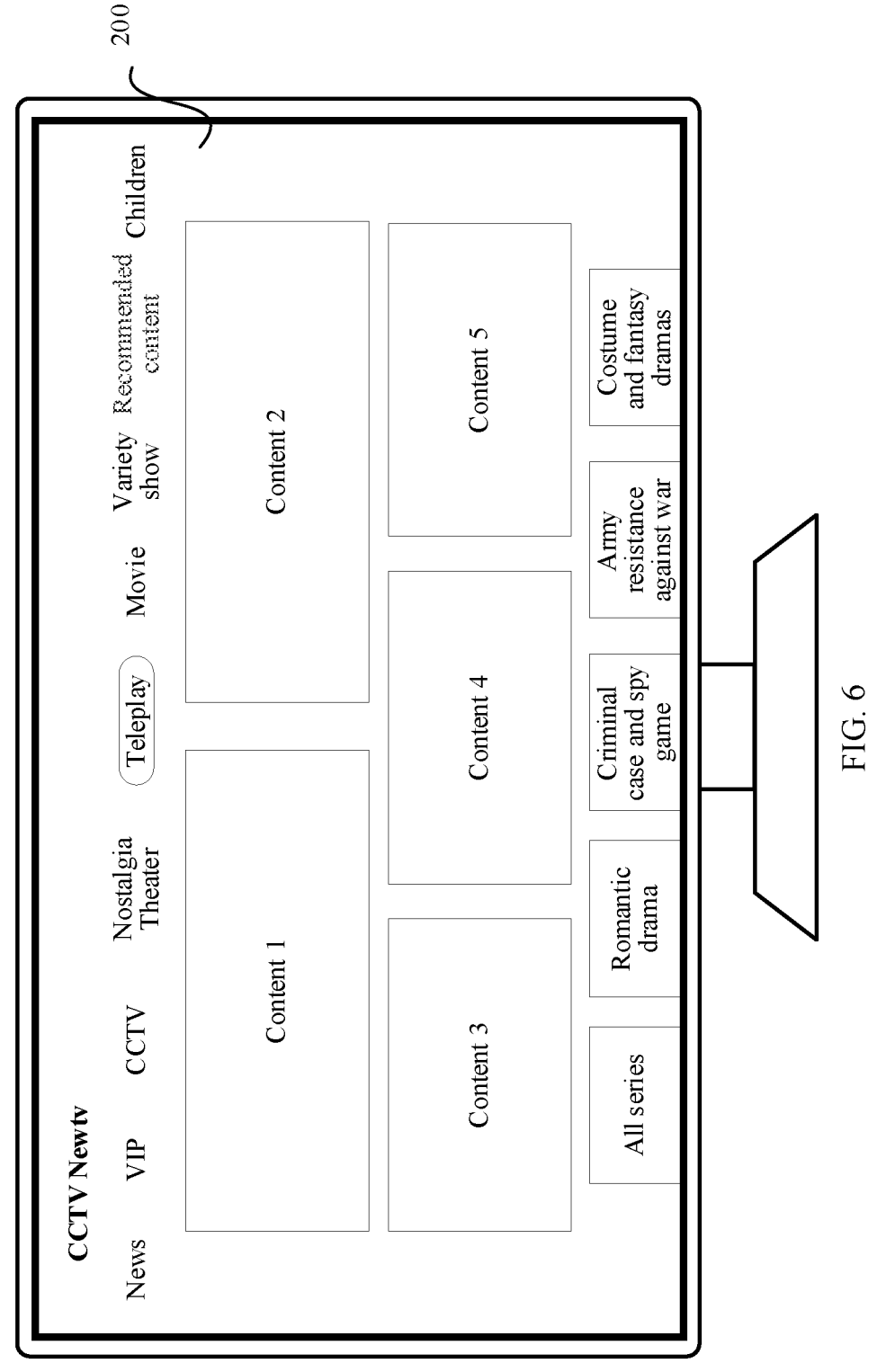
FIG. 6 is a schematic diagram of another scenario of a smart television control method according to an embodiment of this application.

In this embodiment of this application, if preview data associated with a target application button is application interface picture preview data, as shown in FIG. 6, a second interface 200 may be directly displayed after a target application is started. The second interface 200 is a display interface of the target application. The second interface 200 may include individual function buttons of the target application. The second interface 200 shown in FIG. 6 is a display interface of a new audio-visual application after the new audio-visual application is started.

Figure 7:
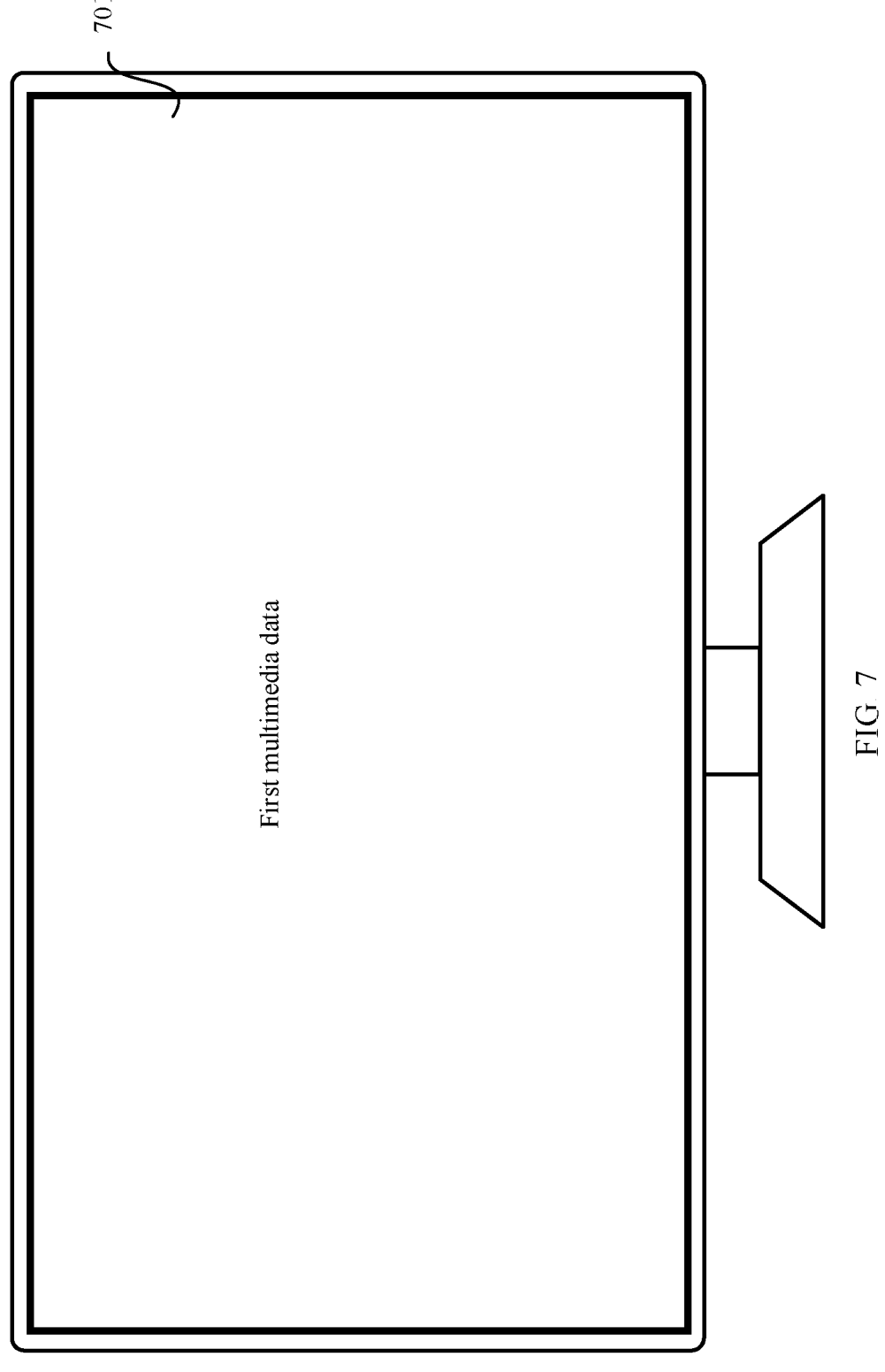
FIG. 7 is a schematic diagram of another scenario of a smart television control method according to an embodiment of this application.

If the preview data associated with the target application button is video preview data, first multimedia data corresponding to the video preview data may be determined first after the target application is started. The first multimedia data may include first video data and first audio data. Then, as shown in FIG. 7, a playback window 701 associated with the target application may be displayed, and the first multimedia data is played in the playback window 701. Different from the foregoing preview display, in the playback window 701, the first multimedia data may be played in full screen. In other words, the playback window 701 only displays the first multimedia data and no longer displays other control information such as application buttons. In addition, because the first multimedia data includes the first audio data, the user may perceive not only picture information, but also sound information in a process of playing the first multimedia data in the playback window 701.

An example in which the target application is an input source application is used for description. After the input source application is started, a playback window of the input source application is displayed, and first multimedia data currently provided by the input source application is played in the playback window.

According to the foregoing technical solution, after the cursor is positioned to an application button, automatic recognition of user intention may be implemented based on dwell duration of the cursor. In addition, after the dwell duration exceeds a duration threshold, an application is automatically started. This avoids the user failing to start the application successfully due to misleading of preview content, thereby improving user experience.

FIG. 8 is another schematic flowchart of a smart television control method according to an embodiment of this application. As shown in FIG. 8, the smart television control method according to this embodiment of this application may include:

Step 201. Display a first interface, where the first interface includes a target application button, and the target application button is associated with preview data.

Step 202. Determine whether a current user mode is a first user mode. If yes, step 203 is performed; otherwise, step 206 is performed.

Step 203. Determine a first application button from the target application buttons, and position an initial position of a cursor to the first application button.

Step 204. After the cursor is detected to be positioned to the first application button, time dwell duration of the cursor on the first application button.

Step 205. After the dwell duration is determined to exceed a duration threshold, start a first application corresponding to the first application button.

Step 206. After the cursor is detected to be positioned to the target application button, start, in response to a trigger operation on a target application, the target application corresponding to the target application button.

In this embodiment of this application, a plurality of different user modes may be set. For different user modes, this embodiment of this application may provide different operation methods. For example, a variety of different user modes may include a first user mode, a second user mode, a third user mode, and the like. For example, the first user mode may be an elder mode. For example, the second user mode may be a standard mode. For example, the third user mode may be a child mode, and the like.

After the first interface is displayed, a current user mode may be determined first.

In a possible implementation, the current user mode is determined as the first user mode. In this implementation, the first application button where the cursor stays by default may be determined from the target application buttons. Further, the initial position of the cursor may be positioned to the first application button.

In this embodiment of this application, the first application button may be a button corresponding to a most frequently used application in the first user mode in the target application buttons. For example, when the first user mode is the elder mode, the first application button may be a new audio-visual application button. In this way, in the first user mode, a commonly used application button by a user is automatically positioned, thereby reducing time in selecting an application of the user and improving user experience.

Alternatively, the first application button may be an application button pre-selected from the target application buttons by a manufacturer based on a promotion strategy. In this way, in the first user mode, a current popular application button is automatically positioned, thereby facilitating use by the user.

After the cursor is positioned to the first application button, preview data associated with the first application button may be displayed on the background page 120 of the first interface 100.

In addition, because the first application button is one of the target application buttons, when the cursor is detected to be positioned to the first application button, it may be considered that the cursor is positioned to the target application button, and timing of the dwell duration of the cursor is started.

During timing, the user may move or maintain a position of the cursor according to requirements. When the user maintains the position of the cursor, and after the dwell duration is determined to exceed the duration threshold, the first application may be started. Correspondingly, if the position of the cursor is detected to be moved before the dwell duration exceeds the duration threshold, timing of the dwell duration of the cursor may be restarted after the cursor is detected to be moved to other target application buttons.

In another possible implementation, the current user mode is determined as any user mode other than the first user mode such as the second user mode or the third user mode. In this implementation, different from the foregoing description, the initial position of the cursor may not be limited. In the user mode other than the first user mode, after the cursor is detected to be positioned to the target application button, the preview data associated with the target application button may be displayed on the background page 120 of the first interface 100. In addition, a trigger operation on the target application button may be detected. After it is determined that the trigger operation on the target application button is detected, the target application may be started in response to the trigger operation. Otherwise, the preview data associated with the target application is continued to be displayed and the trigger operation on the target application is detected. For example, the trigger operation may be a click operation on the target application button and the like.

According to the foregoing technical solution, different operation methods may be provided based on different user modes. In the first user mode, automatic recognition of user intention may be implemented, and an application is automatically started based on the user intention. In the user mode other than the first user mode, the application may be started based on a trigger operation on an application button by the user. In this way, the smart television control method may be more flexible, requirements of different user groups are better satisfied, thereby improving user experience.

In another embodiment of this application, a switching method of the user mode in the foregoing embodiment is described.

Figure 9:
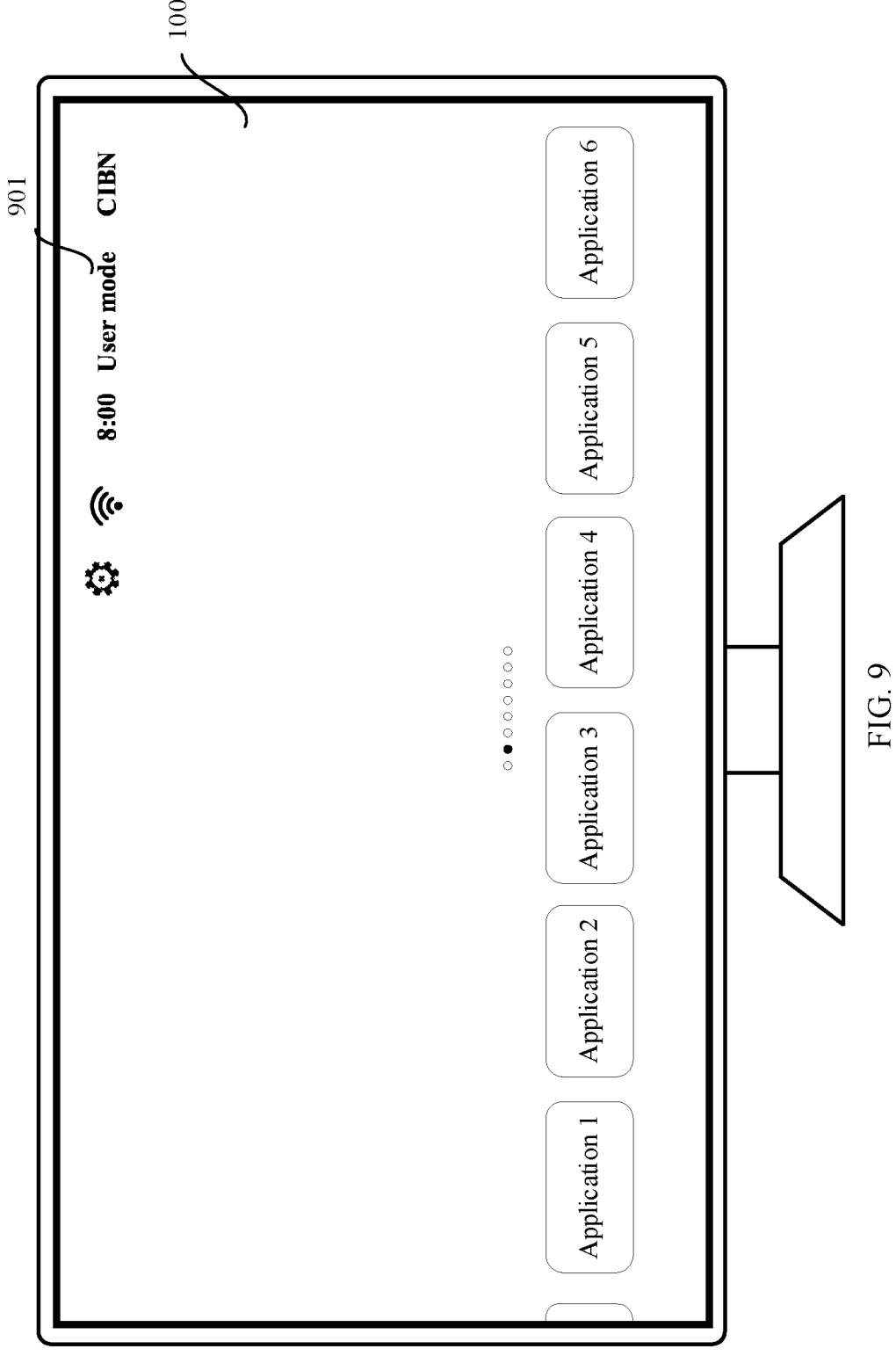
FIG. 9 is a schematic diagram of another scenario of a smart television control method according to an embodiment of this application.

In this embodiment of this application, as shown in FIG. 9, after a first interface 100 is displayed, the first interface 100 may include a first operation button 901. The first operation button 901 may be configured to trigger to display a first setting interface 300. The first setting interface 300 is a setting interface of a user mode. For example, the first operation button 901 may be located at an upper edge of the first interface 100.

Figure 10:
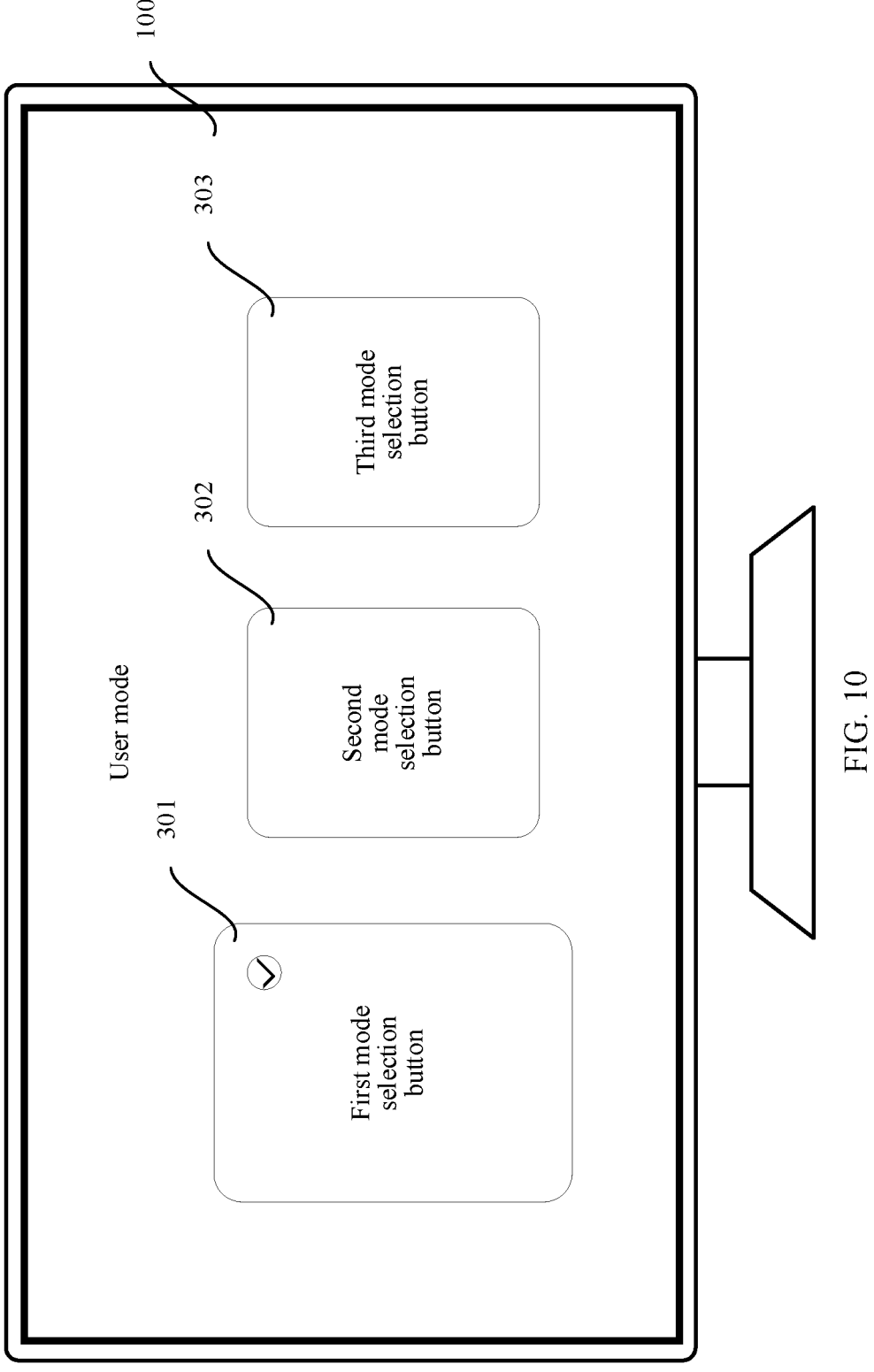
FIG. 10 is a schematic diagram of another scenario of a smart television control method according to an embodiment of this application.

The first setting interface 300 may be displayed in response to a first operation on the first operation button 901. For example, the first operation may be a click operation. FIG. 10 shows a possible layout type of the first setting interface 300. As shown in FIG. 10, the first setting interface 300 may include a plurality of mode selection buttons, such as a first mode selection button 301, a second mode selection button 302, and a third mode selection button 303.

In this embodiment of this application, after a cursor is detected to be positioned to any mode selection button, a graphic style of the mode selection button may be changed. For example, the mode selection button may be enlarged to make the mode selection button highlight compared with other mode selection buttons. As shown in FIG. 10, after the cursor is detected to be positioned to the first mode selection button 301, the first mode selection button 301 may be enlarged to enable the first mode selection button to be highlighted.

After the cursor is detected to be positioned to any mode selection button, further, the current user mode may be switched, in response to a second operation on the mode selection button, to a user mode corresponding to the mode selection button. For example, the current user mode may be switched to a first user mode in response to a second operation on the first mode selection button 301. The second operation may be, such as a click operation on a mode selection button.

According to the foregoing method, the user mode may be switched flexibly.

In another implementation, after the first interface 100 is displayed, the first setting interface 300 may be triggered to be displayed in response to a received first voice signal. Specifically, the first voice signal may be, such as a "user mode". After a voice signal is received, a trigger instruction is generated. The trigger instruction may be used for triggering to display the first setting interface 300.

Further, the user mode may be switched based on the first setting interface 300. Specifically, selection and switching of the user mode may be triggered in response to a received second voice signal. Specifically, the second voice signal may include a specific user mode type, such as a "first user mode". After the second voice signal is received, voice recognition may be performed on the user mode type included in the second voice signal. Further, the current user mode may be switched to a corresponding user mode based on a voice recognition result.

According to this implementation, an operation process of various operation buttons is avoided, so that a switching process of the user mode can be more intelligent and simplified, thereby helping improve user experience.

It may be understood that to implement the foregoing functions, an electronic device includes corresponding hardware and/or software modules for performing the functions. Steps in the examples described with reference to the embodiments disclosed in this specification can be implemented by hardware or a combination of hardware and computer software in this application. Whether a function is performed by the hardware or hardware driven by computer software depends on particular applications and design constraints of the technical solutions. A person skilled in the art may use different methods to implement the described functions with reference to embodiments for each particular application.

In the embodiments, the electronic device may be divided into function modules according to the foregoing method example. For example, each function module may be obtained through division based on each corresponding function, or two or more functions may be integrated into one processing module. The integrated module may be implemented in a form of hardware. It should be noted that the division of the modules in this embodiment is an example, and is merely logical function division, and there may be other division modes during actual implementation.

Figure 11:
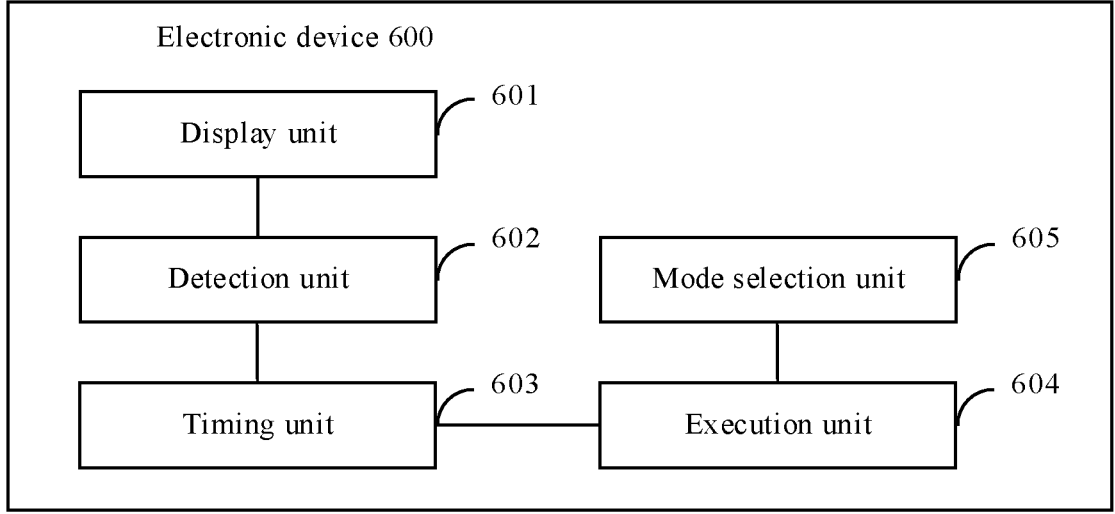
FIG. 11 is a schematic diagram of a structure of an electronic device according to an embodiment of this application.

When function modules are obtained through division by using corresponding functions, FIG. 11 is a schematic diagram of possible composition of an electronic device related to the foregoing embodiments. As shown in FIG. 11, the electronic device 600 may include a display unit 601, a detection unit 602, a timing unit 603, and an execution unit 604. The display unit 601 is configured to display a first interface, where the first interface includes a target application button, and the target application button is associated with preview data.

The detection unit 602 is configured to detect that a cursor is positioned to the target application button.

The timing unit 603 is configured to time dwell duration of the cursor on the target application button.

The execution unit 604 is configured to start, after the dwell duration is determined to exceed a duration threshold, a target application corresponding to the target application button.

In a possible implementation, the electronic device 600 further includes a mode selection unit 605, configured to determine that a current user mode is a first user mode before the detection unit 602 detects that the cursor is positioned to the target application button.

In a possible implementation, after the mode selection unit 605 determines that the current user mode is the first user mode, the detection unit 602 is further configured to: determine a first application button from the target application button, and position an initial position of the cursor to the first application button.

In a possible implementation, when the mode selection unit 605 determines that the current user mode is not the first user mode, and after the detection unit 602 detects that the cursor is positioned to the target application button, the execution unit 604 is further configured to start, in response to a trigger operation on the target application button, the target application corresponding to the target application button.

In a possible implementation, when it is determined that the current user mode is not the first user mode, the mode selection unit 605 is further configured to switch the current user mode to the first user mode in response to a target operation.

In a possible implementation, the first interface further includes a first operation button. The mode selection unit 605 is specifically configured to: display a first setting interface in response to a first operation on the first operation button, where the first setting interface includes a first mode selection button; and switch the current user mode to the first user mode in response to a second operation on the first mode selection button.

In a possible implementation, after the cursor is detected to be positioned to the target application button, the detection unit 602 is further configured to display a first control on the first interface. The first control includes first text, and the first text indicates remaining duration before the target application is started.

In a possible implementation, the first interface includes a background page. After the cursor is detected to be positioned to the target application button, the detection unit 602 is further configured to display the preview data associated with the target application button on the background page.

In a possible implementation, the preview data includes video preview data. After the target application corresponding to the target application button is started, the execution unit 604 is further configured to determine first multimedia data corresponding to: the video preview data, where the first multimedia data includes first video data and first audio data; and play the first multimedia data in a playback window associated with the target application.

In a possible implementation, the first interface further includes a foreground page. The display unit 601 is specifically configured to display the foreground page. The foreground page includes a dockbar, and the dockbar includes the target application button.

According to the foregoing technical solution, after the cursor is positioned to an application button, automatic recognition of user intention may be implemented based on dwell duration of the cursor. In addition, after the dwell duration exceeds a duration threshold, an application is automatically started. This avoids the user failing to start the application successfully due to misleading of preview content, thereby improving user experience.

It should be understood that the electronic device herein is embodied in a form of a functional unit. The term "unit" herein may be implemented in a form of software and/or hardware. This is not specifically limited. For example, the "unit" may be a software program, a hardware circuit, or a combination of the software program and the hardware circuit for implementing the foregoing functions. The hardware circuit may include an application specific integrated circuit (application specific integrated circuit, ASIC), an electronic circuit, a processor (for example, a shared processor, a special purpose processor, or a group processor) configured to execute one or more software or firmware programs, a memory, a combinational logical circuit, and/or another suitable component that supports the described functions.

This application further provides an electronic device. The device includes a storage medium and a central processing unit. The storage medium may be a non-volatile storage medium, and a computer-executable program is stored in the storage medium. The central processing unit is connected to the non-volatile storage medium, and executes the computer-executable program to implement the smart television control method.

The foregoing electronic device may be a smart television.

Figure 12:
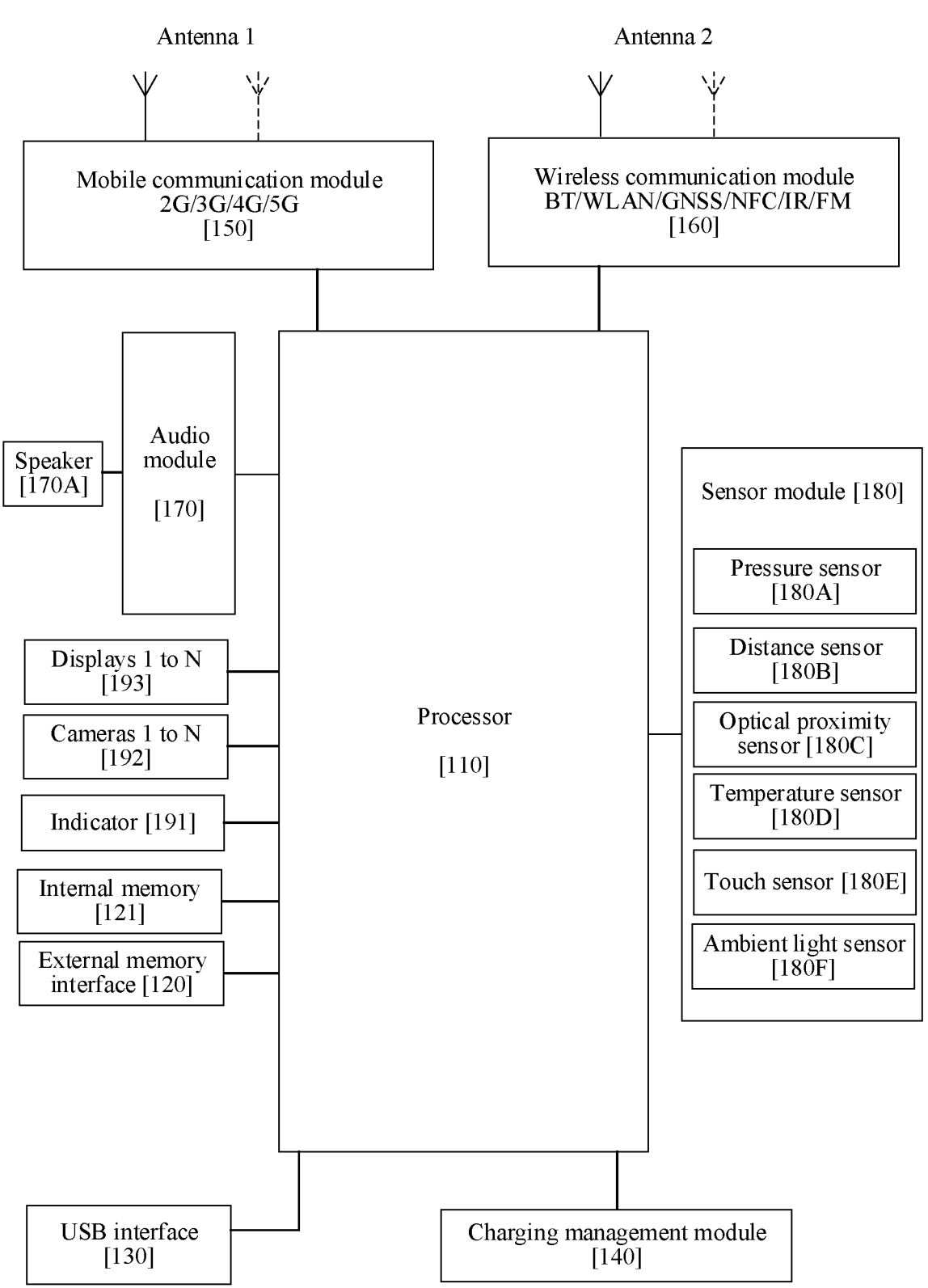
FIG. 12 is a schematic diagram of another structure of an electronic device according to an embodiment of this application.

For example, FIG. 12 is a schematic diagram of a structure of an electronic device according to an embodiment of this application. The electronic device may include a processor 110, an external memory interface 120, an internal memory 121, a universal serial bus (universal serial bus, USB) interface 130, a charging management module 140, an antenna 1, an antenna 2, a mobile communication module 150, a wireless communication module 160, an audio module 170, a sensor module 180, an indicator 191, a camera 192, a display 193, and the like. Optionally, the audio module 170 may include a speaker 170A. The sensor module 180 may include a pressure sensor 180A, a distance sensor 180B, an optical proximity sensor 180C, a temperature sensor 180D, and a touch sensor 180E, an ambient light sensor 180F, and the like.

It may be understood that the schematic structure in this embodiment of this application constitutes no specific limitation on the electronic device. In some other embodiments of this application, the electronic device may include more or fewer components than those shown in the figure, some components may be combined, some components may be split, or a different component deployment may be used. The components in the figure may be implemented by hardware, software, or a combination of software and hardware.

The processor 110 may include one or more processing units. Different processing units may be separate components, or may be integrated into one or more processors.

The controller may be a nerve center and a command center of the electronic device. The controller may generate an operation control signal according to instruction operation code and a timing signal, and implement control on instruction fetching and instruction execution.

A memory configured to store instructions and data may be further disposed in the processor 110. In some embodiments, the memory in the processor 110 is a cache.

In some embodiments, the processor 110 may include one or more interfaces. The interfaces may include a wired MIC interface, a high definition multimedia interface (High Definition Multimedia Interface, HDMI), an inter-integrated circuit (inter-integrated circuit, I2C) interface, an inter-integrated circuit sound (inter-integrated circuit sound, I2S) interface, a general-purpose input/output (general-purpose input/output, GPIO) interface, a universal serial bus (universal serial bus, USB) interface, and/or the like.

It may be understood that an interface connection relationship between the modules illustrated in this embodiment is merely an example for description, and does not constitute a limitation on the structure of the electronic device. In some other embodiments of this application, the electronic device may alternatively use an interface connection manner different from that in the foregoing embodiment, or use a combination of a plurality of interface connection manners.

The internal memory 121 may be configured to store computer-executable program code. The executable program code includes instructions. The internal memory 121 may include a program storage area and a data storage area. The program storage area may store an operating system, an application required by at least one function, and the like. The data storage area may store data created when the electronic device is used. In addition, the internal memory 121 may include a high-speed random access memory, or may include a non-volatile memory, for example, at least one magnetic disk storage device, a flash memory device, or a universal flash storage (universal flash storage, UFS). The processor 110 runs the instructions stored in the internal memory 121 and/or the instructions stored in the memory arranged in the processor, to implement various functional applications and data processing of the electronic device.

The pressure sensor 180A is configured to sense a pressure signal, and may convert the pressure signal into an electrical signal. In some embodiments, the pressure sensor 180A may be disposed on the display 193. There are many types of pressure sensors 180A, such as a resistive pressure sensor, an inductive pressure sensor, and a capacitive pressure sensor.

The distance sensor 180B is configured to measure a distance. The electronic device may measure a distance through infrared or laser.

The temperature sensor 180D is configured to detect a temperature. In some embodiments, the electronic device executes a temperature processing policy by using the temperature detected by the temperature sensor 180D.

The touch sensor 180E is also referred to as a "touch device". The touch sensor 180E may be disposed on the display 193. The touch sensor 180E and the display 193 form a touchscreen, which is also referred to as a "touch screen". The touch sensor 180E is configured to detect a touch operation performed on or near the touch sensor 180E. The touch sensor may transfer a detected touch operation to the application processor to determine a touch event type. A visual output related to a touch operation may be provided through the display 193. In some other embodiments, the touch sensor 180E may be alternatively disposed on a surface of the electronic device, and is located on a position different from that of the display 193.

This application further provides a computer-readable storage medium. The computer-readable storage medium stores instructions. When the instructions are run on a computer, the computer is enabled to perform steps of the smart television control method according to this application.

This application further provides a computer program product including instructions. When the computer program product runs on a computer or at least one processor, the computer is enabled to perform steps of the smart television control method according to this application.

This application further provides a chip, including a processor and a data interface. The processor reads, by using the data interface, instructions stored in a memory, to perform a corresponding operation and/or procedure in the smart television control method provided in this application.

Optionally, the chip further includes the memory. The memory is connected to the processor through a circuit or a wire. The processor is configured to read and execute a computer program in the memory. Further, optionally, the chip further includes a communication interface, and the processor is connected to the communication interface. The communication interface is configured to receive data and/or information to be processed. The processor obtains the data and/or the information from the communication interface, and processes the data and/or the information. The communication interface may be an input/output interface.

The memory may be a read-only memory (read-only memory, ROM), another type of static storage device that can store static information and instructions, a random access memory (random access memory, RAM), or another type of dynamic storage device that can store information and instructions, or may alternatively be an electrically erasable programmable read-only memory (electrically erasable programmable read-only memory, EEPROM), a compact disc read-only memory (compact disc read-only memory, CD-ROM), or another compact disc storage, an optical disc storage (including a compressed optical disc, a laser disc, an optical disc, a digital versatile optical disc, a Blu-ray disc, and the like), a magnetic disk storage medium or another magnetic storage device, or may be any another medium that can be configured to carry or store expected program code in a form of an instruction or a data structure and that can be accessed by a computer.

In embodiments of this application, the term "and/or" describes an association relationship of associated objects, and indicates that three relationships may exist. For example, A and/or B may indicate the following three cases: Only A exists, both A and B exist, and only B exists. A and B may be singular or plural. The character "/" generally indicates an "or" relationship between the associated objects. "At least one of the following" or similar expressions refer to any combination of these items, including a single item or any combination of a plurality of items. For example, at least one of a, b, and c may represent a, b, c, a and b, a and c, b and c, or a, b, and c, where a, b, and c may be single or plural.

A person of ordinary skill in the art may be aware that the units and algorithm steps described in embodiments disclosed herein can be implemented by a combination of electronic hardware, computer software, and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood that a person skilled in the art that, for the purpose of convenient and brief description, for a detailed working processes of the foregoing system, an apparatus, and unit, refer to corresponding processes in the foregoing method embodiments, and details are not described herein again.

In several embodiments provided in this application, when any function is implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, and a compact disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

The invention claimed is:

1. A method, comprising: displaying a first interface that comprises a target application button, wherein the target application button is associated with preview data; detecting that a cursor is positioned on the target application button; responsive to a current user mode being a first user mode: timing a dwell duration of the cursor on the target application button; and starting a target application corresponding to the target application button after the dwell duration exceeds a duration threshold; and responsive to the current user mode not being the first user mode, starting the target application corresponding to the target application button in response to a trigger operation on the target application button.

2. The method of claim 1, wherein after the current user mode is the first user mode, the method further comprises positioning an initial position of the cursor on a first application button based on the target application button.

3. The method of claim 1, wherein when the current user mode is not the first user mode, the method further comprises switching the current user mode to the first user mode in response to a target operation.

4. The method of claim 3, wherein the first interface further comprises a first operation button, and switching the current user mode to the first user mode in response to the target operation comprises:

displaying a first setting interface in response to a first operation on the first operation button, wherein the first setting interface comprises a first mode selection button; and switching the current user mode to the first user mode in response to a second operation on the first mode selection button.

5. The method of claim 1, wherein after detecting that the cursor is positioned on the target application button, the method further comprises displaying a first control on the first interface, wherein the first control comprises first text that indicates a remaining duration before the target application is started.

6. The method of claim 1, wherein the first interface comprises a background page, and after detecting that the cursor is positioned on the target application button, the method further comprises displaying the preview data associated with the target application button on the background page.

7. The method of claim 6, wherein the first interface further comprises a foreground page that comprises a dockbar, wherein the dockbar comprises the target application button.

8. The method of claim 1, wherein the preview data comprises video preview data, and after starting the target application, the method further comprises playing first multimedia data in a playback window associated with the target application, wherein the first multimedia data corresponds to the video preview data, and comprises first video data and first audio data.

9. The method of claim 1, further comprising responsive to detecting that the cursor is positioned on the target application button, presenting the preview data in the first interface.

10. The method of claim 9, further comprising reducing an opacity of the target application button responsive to presenting the preview data in the first interface.

11. The method of claim 10, wherein the target application button overlays a portion of the preview data.

12. The method of claim 11, wherein the first interface comprises a preview window in which the preview data is presented.

13. The method of claim 11, wherein the first interface comprises a background and a foreground, wherein the preview data is presented in the background, and wherein the target application button is in the foreground.

14. A non-transitory computer-readable storage medium, storing instructions that, when executed by one or more processors of an electronic device, cause the electronic device to be configured to:

display a first interface that comprises a target application button, wherein the target application button is associated with preview data;

detect that a cursor is positioned on the target application button;

time a dwell duration of the cursor on the target application button; and start a target application corresponding to the target application button after the dwell duration exceeds a duration threshold, wherein a current user mode is a first user mode before detecting that the cursor is positioned on the target application button, and wherein when the current user mode is not the first user mode, and after detecting that the cursor is positioned on the target application button, the instructions, when executed by the one or more processors, further cause the electronic device to be configured to start the target application corresponding to the target application button in response to a trigger operation on the target application button.

15. The non-transitory computer-readable storage medium of claim 14, wherein after the current user mode is the first user mode, the instructions, when executed by the one or more processors, further cause the electronic device to be configured to position an initial position of the cursor on a first application button based on the target application button.

16. An electronic device, comprising: one or more processors; and a memory coupled to the one or more processors and configured to store instructions that, when executed by the one or more processors, cause the electronic device to be configured to: display a first interface that comprises a target application button, wherein the target application button is associated with preview data; detect that a cursor is positioned on the target application button; responsive to a current user mode being a first user mode: time a dwell duration of the cursor on the target application button; and start a target application corresponding to the target application button after the dwell duration exceeds a duration threshold; and responsive to the current user mode not being the first user mode, starting the target application corresponding to the target application button in response to a trigger operation on the target application button.

17. The electronic device of claim 16, wherein after the current user mode is the first user mode, the instructions, when executed by the one or more processors, further cause the electronic device to be configured to position an initial position of the cursor on a first application button based on the target application button.

18. The electronic device of claim 16, wherein when the current user mode is not the first user mode, the instructions, when executed by the one or more processors, further cause the electronic device to be configured to switch the current user mode to the first user mode in response to a target operation.

19. The electronic device of claim 18, wherein the first interface further comprises a first operation button, and switching the current user mode to the first user mode in response to the target operation comprises:

displaying a first setting interface in response to a first operation on the first operation button, wherein the first setting interface comprises a first mode selection button; and switching the current user mode to the first user mode in response to a second operation on the first mode selection button.

20. The electronic device of claim 16, wherein after detecting that the cursor is positioned on the target application button, the instructions, when executed by the one or more processors, further cause the electronic device to be configured to display a first control on the first interface, wherein the first control comprises first text that indicates a remaining duration before the target application is started.

\* \* \* \* \*